(12) United States Patent
Kinsey

(10) Patent No.: US 11,917,006 B2
(45) Date of Patent: Feb. 27, 2024

(54) CLOUD-BASED INDEX AND CENTRALIZED CLOUD-BASED HUB INTERFACE FOR CLOUD-STORED MEDIA

(71) Applicant: Stanley Bruce Kinsey, Rancho Santa Fe, CA (US)

(72) Inventor: Stanley Bruce Kinsey, Rancho Santa Fe, CA (US)

(73) Assignee: Stanley Bruce Kinsey, CA (US)

( * ) Notice: Subject to any disclaimer, the term of this patent is extended or adjusted under 35 U.S.C. 154(b) by 76 days.

(21) Appl. No.: 16/755,460

(22) PCT Filed: Oct. 3, 2018

(86) PCT No.: PCT/US2018/054081
§ 371 (c)(1),
(2) Date: Apr. 10, 2020

(87) PCT Pub. No.: WO2019/074732
PCT Pub. Date: Apr. 18, 2019

(65) Prior Publication Data
US 2020/0244733 A1 Jul. 30, 2020

Related U.S. Application Data

(60) Provisional application No. 62/571,547, filed on Oct. 12, 2017.

(51) Int. Cl.
*G06F 15/16* (2006.01)
*G06F 9/54* (2006.01)
(Continued)

(52) U.S. Cl.
CPC ...... *H04L 67/1097* (2013.01); *G06F 16/2246* (2019.01); *G06F 16/41* (2019.01);
(Continued)

(58) Field of Classification Search
CPC . H04L 67/1097; G06F 16/43; G06F 16/2246; G06F 16/953; G06F 16/41; G06F 21/6218
(Continued)

(56) References Cited

U.S. PATENT DOCUMENTS 8,762,512 B1 * 6/2014 Sundaram ............... H04L 67/10
709/224
9,633,024 B2 * 4/2017 Demilo ................... G06F 16/13
(Continued)

FOREIGN PATENT DOCUMENTS

WO WO-2021032998 A1 * 2/2021 ......... H04N 21/2393

OTHER PUBLICATIONS

International Search Report and Written Opinion for Application No. PCT/US2018/054081 dated Dec. 11, 2018 (19 pages).

*Primary Examiner* — Hamza N Algibhah
(74) *Attorney, Agent, or Firm* — MICHAEL BEST & FRIEDRICH LLP

(57) ABSTRACT

Systems and methods for providing cloud-based centralized hub access to media stored in a plurality of cloud services. One system includes a non-transitory, computer-readable medium storing a cloud-based hub accessible by a user via a user device over a communication network, and an electronic processor. The electronic processor is configured to execute the cloud-based hub to receive input from the user selecting an entity, access an index associated with the entity, a first entry in the index including a link to first media accessible through a first cloud service and a second entry in the index including a second link to second media accessible through a second cloud service, and, in response to selection of the first entry in the index by the user, redirect the user from the cloud-based hub to the first media accessible through the first cloud service.

18 Claims, 28 Drawing Sheets

(51) Int. Cl.
*H04L 29/06* (2006.01)
*H04L 67/1097* (2022.01)
*G06F 16/43* (2019.01)
*G06F 16/22* (2019.01)
*G06F 16/953* (2019.01)
*G06F 16/41* (2019.01)
*G06F 21/62* (2013.01)

(52) U.S. Cl.
CPC ............ *G06F 16/43* (2019.01); *G06F 16/953* (2019.01); *G06F 21/6218* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 10,482,096 | B2* | 11/2019 | Raghunathan | G06F 16/2471 |
| 10,534,835 | B2* | 1/2020 | Barman | H04N 21/6581 |
| 10,771,553 | B2* | 9/2020 | Huang | H04L 67/1097 |
| 11,137,964 | B2* | 10/2021 | Saito | G06F 16/16 |
| 2007/0044026 | A1* | 2/2007 | Potter | H04M 3/4217 |
| | | | | 715/741 |
| 2007/0055689 | A1* | 3/2007 | Rhoads | H04N 1/32352 |
| | | | | 707/999.102 |
| 2011/0145439 | A1* | 6/2011 | Chaturvedi | G06F 9/5027 |
| | | | | 709/244 |
| 2012/0192263 | A1* | 7/2012 | Lin | H04L 67/1097 |
| | | | | 726/12 |
| 2012/0304233 | A1* | 11/2012 | Roberts | H04N 21/43615 |
| | | | | 725/82 |
| 2013/0046982 | A1* | 2/2013 | Suh | H04L 63/102 |
| | | | | 713/171 |
| 2013/0111404 | A1* | 5/2013 | Yang | H04L 67/1097 |
| | | | | 715/811 |
| 2013/0219176 | A1* | 8/2013 | Akella | G06F 16/185 |
| | | | | 713/165 |
| 2014/0006350 | A1* | 1/2014 | Fukui | G06F 16/178 |
| | | | | 707/632 |
| 2014/0059059 | A1* | 2/2014 | Barman | H04N 21/6581 |
| | | | | 707/752 |
| 2014/0189479 | A1* | 7/2014 | Glennon | G06F 16/958 |
| | | | | 715/205 |
| 2015/0074819 | A1* | 3/2015 | Borenstein | G06F 16/213 |
| | | | | 707/706 |
| 2015/0186478 | A1* | 7/2015 | Yan | G06F 16/24578 |
| | | | | 707/722 |
| 2016/0323381 | A1* | 11/2016 | Huang | H04L 67/1097 |
| 2017/0024392 | A1* | 1/2017 | Shah | G06F 16/24552 |
| 2017/0034312 | A1* | 2/2017 | Lopez, Jr. | H04W 4/14 |
| 2017/0041436 | A1* | 2/2017 | Lopez, Jr. | G06F 16/9566 |
| 2017/0277722 | A1* | 9/2017 | Noh | G06F 16/5846 |
| 2017/0300706 | A1* | 10/2017 | Jassal | G06F 16/128 |
| 2017/0310751 | A1* | 10/2017 | Yeung | H04L 67/1097 |
| 2018/0060320 | A1* | 3/2018 | Oganian | G06F 3/0482 |
| 2018/0063213 | A1* | 3/2018 | Bevilacqua-Linn | H04L 65/80 |
| 2018/0268010 | A1* | 9/2018 | Park | G06F 16/211 |

* cited by examiner

ARCHIVE SMART    DASHBOARD    GUEST TREE    MANAGE PERMISSIONS    BLOG    HELP AND SUPPORT    ✉    👤 HI STANLEY

SUSAN SNYDER
JUL 2, 1992-LIVING

COLLECTION          TIMELINE

≫ EXPAND ALL    ≪ COLLAPSE ALL                                    ➕ ADD CHAPTER

▢ PHOTOS

YOUNG SUSAN
BEST OF SUSAN'S EARLY YEARS.                                       ➕ ADD ENTRY    ☆/⊖  ≡

GRADES K THROUGH 6TH
60 GREAT PHOTOS                                                    ☆/⊖  ≡

▢ YOUTH PASSIONS                                                   ➕ ADD ENTRY

3 PIANO RECITAL VIDEOS
VARIOUS RECITALS AGE 7 TO 18. SUSAN BECAME AN ACCOMPLISHED
PIANIST AND PERFORMED MANY RECITALS                                ☆/⊖  ≡

2 JUNIOR GOLF TOURNAMENTS
SUSAN PLAYED COMPETITIVE GOLF FROM AGE 7 THROUGH TO COLLEGE. THIS
COLLECTION SHOWS AGES 7 THOUGH                                     ☆/⊖  ≡

▢ TRAVEL                                                           ➕ ADD ENTRY

SUSAN'S INSTAGRAM ACCOUNT-CURRENT!
SUSAN'S NEW ACTIVE INSTAGRAM ACCOUNT.                              ☆/⊖  ≡

FIG. 3

| ARCHIVE SMART | DASHBOARD | GUEST TREE | MANAGE PERMISSIONS | BLOG | HELP AND SUPPORT | ☒ | 👤 HI STANLEY |

CLAIRE & COLIN
COLLECTION

TIMELINE

◇ EXPAND ALL   ◇ COLLAPSE ALL                                                    + ADD CHAPTER

☐ WEDDING- JUNE 15, 2014                                                          + ADD ENTRY

🖼 OFFICIAL WEDDING VIDEO
   8 MINUTE PROFESSIONAL VIDEO ON VIMEO                                           ☆ 📄 ≡

🖼 YOUNG CLAIRE & COLIN- REHEARSAL DINNER
   10 MINUTE SLIDE SHOW SHOWN AT REHEARSAL DINNER                                 ☆ 📄 ≡

🖼 WEDDING PHOTOS
   PROFESSIONAL WEDDING PHOTOS                                                    ☆ 📄 ≡

🖼 AFTER- WEDDING PARTY-ARMY-NAVY FOOTBA...
   GAME DAY PARTY AT SNYDER'S- THE DAY AFTER THE WEDDING.                         ☆ 📄 ≡

☐ FIRST HOUSE                                                                     + ADD ENTRY

🖼 MOVE IN DAY- 2018                                                              ☆ 📄 ≡

☐ TRAVEL                                                                          + ADD ENTRY

🖼 TRAVEL INSTAGRAM
   PRINTABLE PHOTOBOOK OF OUR TRIP TO THAILAND- AUGUST
   2017 PRINTABLE PHOTOBOOK OF OUR TRIP TO THAILAND- AUGUST 2017                  ☆ 📄 ≡

🖼 THAILAND 2017 PRINTABLE PHOTOBOOK OF OUR TRIP TO
   THAILAND- AUGUST 2017                                                          ☆ 📄 ≡

FIG. 4

ARCHIVESMART  HOME  <u>FAMILY TREE</u>  HELP  BLOG  FAQ  LOGOUT

MEDIA COLLECTION

LORETTA PATTERSON

SEP, 13 1932-JUN, 01 2016  (TIMELINE)

LORETTA PATTERSON WAS BORN IN 1932 IN SHAWNEE, OKLAHOMA, NEAR "INDIAN COUNTRY". AT AGE 4, BECAUSE OF THE DUST BOWL PERIOD OF DRAUGHT IN HER PARENTS MOVED THE FAMILY WEST TO PORTERVILLE, CALIFORNIA. CARRYING ALL THE                             THEIR CAR, THEY TRAVELED WEST ON
                                  ROUTE 66, REACHING CALIFORNIA WITH.IT
WAS QU                            ADVENTURE FOR A
                                  LITTLE GIRL.

ARTIST, WONDERFUL WIFE, MOTHER, AND
LORE                              GRANDMOTHER. SHE WAS LOVED BY ALL
                                  WHO WERE LUCKY ENOUGH TO KNOW HER.

LORETTA PATTERSON
THE EARLY YEARS THROUGH
HIGH SCHOOL
1932-1950

✉  🔍 1 OF 36

[BACK]

YOUN                                                              > eBOOK OF LORETTA... FROM BIRTH UNTIL AGE 20      ☆☆☆

20 PAGE FLIPBOOK WITH PHOTOS AND DESCRIPTIONS OF
LORETTAS CHILDHOOD UNTIL AGE 20

BEST OF JIM AND LORETTA                                           >

JIM AND LORETTA'S 50th ANNIVERSARY SLIDE SHOW    ☆☆☆

LORETTA'S HERITAGE                                                >

FAMILY SCRAPBOOK OF JIMMY KINSEY SHOWING HIS GRANDMA  ☆☆  ••
LORETTA "NANA"

FAMILY SCRAPBOOK OF CLAIRE BARBER PRICE SHOWING HER   ☆☆  ••
GRANDMA LORETTA

FIG. 6A

| ARCHIVE SMART | DASHBOARD | GUEST TREE | MANAGE PERMISSIONS | BLOG | HELP AND SUPPORT | ✉ 👤 HI STANLEY |

SHEILA SIMPSON
OCT 4,1940- JAN 14,2016

COLLECTION    TIMELINE

SHEILA WAS BORN IN 1932 IN SHAWNEE, OKLAHOMA, NEAR WHAT WAS THEN STILL CALLED INDIAN COUNTRY. AT AGE 4,BECAUSE OF THE DUST BOWL PERIOD OF DROUGHT IN OKLAHOMA, HER PARENTS MOVED THE FAMILY WEST TO SAN MATEO,CALIFORNIA. CARRYING ALL THE BELONGINGS THEY COULD FIT INTO THEIR CAR, THEY TRAVELLED WEST ON ROUTE 66,FINALLY REACHING CALIFORNIA WITH TWO FLAT TIRES. IT WAS QUITE AN ADVENTURE FOR A LITTLE GIRL.SHEILA BECAME A BEAUTY QUEEN, ARTIST,WONDERFUL WIFE, MOTHER, AND GRANDMOTHER. SHE WAS LOVED BY ALL WHO WERE LUCKY ENOUGH TO KNOW HER.

⌵ EXPAND ALL    ⌃ COLLAPSE ALL    ➕ ADD CHAPTER

▢ YOUNG SHEILA    ➕ ADD ENTRY

EBOOK OF SHEILA... FROM BIRTH UNTIL AGE...
20 PAGE FLIPBOOK WITH PHOTOS AND DESCRIPTIONS OF
SHEILA'S CHILDHOOD UNTIL AGE 20

SHEILA AFTER AGE 20
21 PHOTOS, MOST BETWEEN AGE 20 AND 24

▢ SHEILA'S QUILTS    ➕ ADD ENTRY

SELECTED QUILTS
SHEILA WAS AN EXCELLENT SEAMSTRESS, WHICH SHE LEARNED FORM MOTHER. SHE EVEN
MADE HER OWN WEDDING DRESS IN 1952 FROM A NAVY FLYER SILK PARCHUTE. SHE MADE
CURTAINS FOR ALL KIDS' HOMES, RE-COVERD FURNITURE; MADE BABY BLANKETS_ READ MORE

▢ SHEILA'S PAINTINGS    ➕ ADD ENTRY

WATER COLORS 1990-2016
SHEILA BEST LIKED TO WORK IN WATERCOLORS MOST OF HER CANVAS PAINTINGS WERE
SMALL_MAYBE 5 INCHES X 7 INCHES. SHE HAD NATURAL TALENT BUT ALSO TOOK SOME LESSONS
IN THE LATE '60'S AND BECAME QUITE GOOD.ONCE IN THE EARLY 70'S... READ MORE

▢ SHEILA'S HERITAGE    ➕ ADD ENTRY

FAMILY SCRAPBOOK BY SUSAN SHOWING HER GR...
SHEILA IS SEEN ON PAGES 8 THROUGH 13

FIG. 6B (EXAMPLE OF MEDIA ACCESSED THROUGH THIRD-PARTY CLOUD SERVICE LOCATION)

FIG. 10

ARCHIVESMART   HOME   FAMILY TREE   HELP   BLOG   FAQ          LOGOUT

MEDIA COLLECTION

PHILIP BARBER

DEC, 16 1905 - OCT, 26 1988   ( TIMELINE )

PHIL BARBE | PHIL BARBER | RTERVILLE, CALIFORNIA.
"PHIL" FIRST | UC BERKELEY TRACK | AME THE TOP SPRINTER IN THE U.S
AND HELD | CAREER 1924-1928 | THE UNOFFICIAL WORLD RECORD
IN THE 100 | | YARD DASH FOR 2 YEARS. HE
PROFILED | | WOULD HAVE COMPETED AGAINST
THE REKNOW | | SPRINTERS PROFILED IN THE MOVIE
"CHARIOTS OF | | FIRE", AS HE WAS GIVEN A CHILD.
MEDICAL | | SCHOOL.
PHIL BECOME | | D ON THE USS LOUISVILLE AND
SURVIVED | | SEVERAL ATTACKS. AND
DANGEROUS | BARBER BETTERS WORLD | SITUATIONS. ONE DAY AFTER HE
LEFT THE LOU | RECORD FOR 100 YARDS | S SHIP, KILLING DOZENS OF
SAILORS AND | | THE DOCTOR WHO REPLACED HIM.

[BACK]

[ TRACK ]

TRACK CAREER AT CAL (UC BERKELEY) 1924 - 1927   ☆ ☆ ☆

BETWEEN 1924 AND 1927, PHILIP BARBER WAS ONE OF THE
FASTEST SPRINTER IN THE WORLD, HOLDING THE "UNOFFICIAL"
WORLD RECORD IN THE 100 YARD DASH FOR 2 YEARS.

FIG. 11A

COLLECTION TIMELINE

CLAIRE WAS BORN AT A YOUNG AGE AND CUTE FROM DAY 1. SHE WAS ALWAYS THE LIFE OF THE PARTY EVEN WHEN ONLY TWO YEARS OLD. SHE SAID MANY FUNNY THINGS. LATER SHE GOT OLDER. SHE ENJOYED PIANO AND GOLF AND EVEN WENT ON TO PLAY COLLEGE GOLF. SHE WENT TO UNDERGRAD AND GRAD AT SMU IN ACCOUNTING AND GOT HER CPA WHILE WORKING FOR DELOITTE. SHE DID VERY WELL AND ALL WERE PROUD OF HER. SHE MARRIED COLIN PRICE IN 2015 AND THEY.

CLAIRE WAS BORN A... HE SAID MANY FUNNY
THINGS. LATER SHE

» EXPAND ALL     ＋ADD CHAPTER

☐ CLAIRE IS B

CLAIRE
STARTING WITH THE DAY CLAIRE WAS BORN... MAY 14, 1991. THIS IS WHAT CLAIRE LOOKED LIKE IN HER PRIMARY SCHOOL YEARS. SHE WENT TO EVANS SCHOOL IN LA...READ MORE.        ☆  ⊖
                                                                                                                                                    1 🖻 ✎      ≡

＋ADD ENTRY

☐ PHOTOS OF CLAIRE
FINISH IN THE TOP 25 PLAYERS (THAT ARE NOT ALREADY EXEMPT PER 2. ABOVE) IN THE SEASON ENDING "WEB.COM TOUR PLAYOFFS" WHICH IS THE FINAL 4 TOURNAMEN... READ MORE        ☆  ⊖
                                                                                                                                                    2 🖻 ✎      ≡

4 YOUNG CLAIRE
BEST OF CLAIRE'S EARLY 22 PHOTOS. BEST OF CLAIRE'S EARLY YEARS. 22 PHOTOS. CLAIRE WAS BORN AT A YOUNG AGE AND CUTE FROM DAY 1. S... READ MORE        ☆  ⊖
                                                                                                                                                    3 🖻 ✎      ≡

2 CLAIRE - K THRU GRADE 6
THIS IS WHAT CLAIRE LOOKED LIKE IN HER PRIMARY SCHOOL YEARS. SHE WENT TO EVANS SCHOOL IN LAJOLLA AND WAS A GOOD KID.                                 ☆  ⊖
                                                                                                                                                      🖻 ✎      ≡

☐ YOUTH PASSIONS                                                                                                                                    ＋ADD ENTRY

3 PIANO RECITAL VIDEO
THREE VIDEOS OF CLAIRE PIANO PIANO RECITALS, AGES 10 TO 14                                                                                           ☆  ⊖
                                                                                                                                                      🖻 ✎      ≡

GOLF TOURNAMENT AT LAWRENCE WELT - AGE 1....
CLAIRE'S GOLF STARTS AT MINUTE 4:52 AND LASTS UNTIL MIN 9:00.                                                                                           ⊖
                                                                                                                                                      🖻 ✎      ≡

FIG. 11B

| ARCHIVE SMART | DASHBOARD | GUEST TREE | MANAGE PERMISSIONS | BLOG | HELP AND SUPPORT | ✉ | 👤 HI STANLEY |

SUSAN SNYDER
JUL 2, 1992-LIVING

COLLECTION  |  TIMELINE

≫ EXPAND ALL    ≪ COLLAPSE ALL                                      ＋ ADD CHAPTER

☐ PHOTOS                                                            ＋ ADD ENTRY

YOUNG SUSAN
BEST OF SUSAN'S EARLY YEARS.                                        🎞 / ☆ ⊖ ≡

GRADES K THROUGH 6TH
60 GREAT PHOTOS                                                     ¹🎞 / ☆ ⊖ ≡

☐ YOUTH PASSIONS                                                    ＋ ADD ENTRY

3 PIANO RECITAL VIDEOS
VARIOUS RECITALS AGE 7 TO 18. SUSAN BECAME AN ACCOMPLISHED
PIANIST AND PERFORMED MANY RECITALS                                 🎞 / ☆ ⊖ ≡

2 JUNIOR GOLF TOURNAMENTS
SUSAN PLAYED COMPETITIVE GOLF FROM AGE 7 THROUGH TO COLLEGE. THIS
COLLECTION SHOWS AGES 7 THOUGH                                      🎞 / ☆ ⊖ ≡

☐ TRAVEL                                                            ＋ ADD ENTRY

SUSAN'S INSTAGRAM ACCOUNT-CURRENT!
SUSAN'S NEW ACTIVE INSTAGRAM ACCOUNT.                               🎞 / ☆ ⊖ ≡

| ARCHIVE SMART | DASHBOARD | GUEST TREE | MANAGE PERMISSIONS | BLOG | HELP AND SUPPORT |

ADD NEW ENTRY                                                       ✕

ENTRY NAME*

[                                                                      ]

ENTRY DESCRIPTION

| B  *I*  U  &  X₂  X²  | $I_x$ |  ≡ ≡ |

[                                                                      ]

THIS ENTRY'S PREVIEW IMAGE WILL BE THE SAME AS THAT OF THE FIRST ALBUM CREATED, UNLESS OTHERWISE ADDED BELOW;

┌─────────────────────────────────────────────────────────────┐
│  UPLOAD ENTRY PREVIEW IMAGE                   [CHOOSE FILE] │
│  ONlY JPG, JPEG AND PNG                                     │
└─────────────────────────────────────────────────────────────┘

ALBUMS                                              ✚ CREATE NEW ALBUM

RATING*
☆ ☆ ☆

[SAVE]  [CLOSE]

ARCHIVE SMART  HOME  FAMILYTREE  HELP  BLOG  FAQ  RESET PASSWORD  LIVE DEMO  LOGOUT

TIMELINE

LORETTA PATTERSON

SEP, 13 1932-JUN, 01 2016

MEDIA CALLECTION

FACTS

BORN
1932-01-01 - OKLAHOMA

MARRIED TO JAMES BARBER
1952-04-04 - PENSACOLA, FL

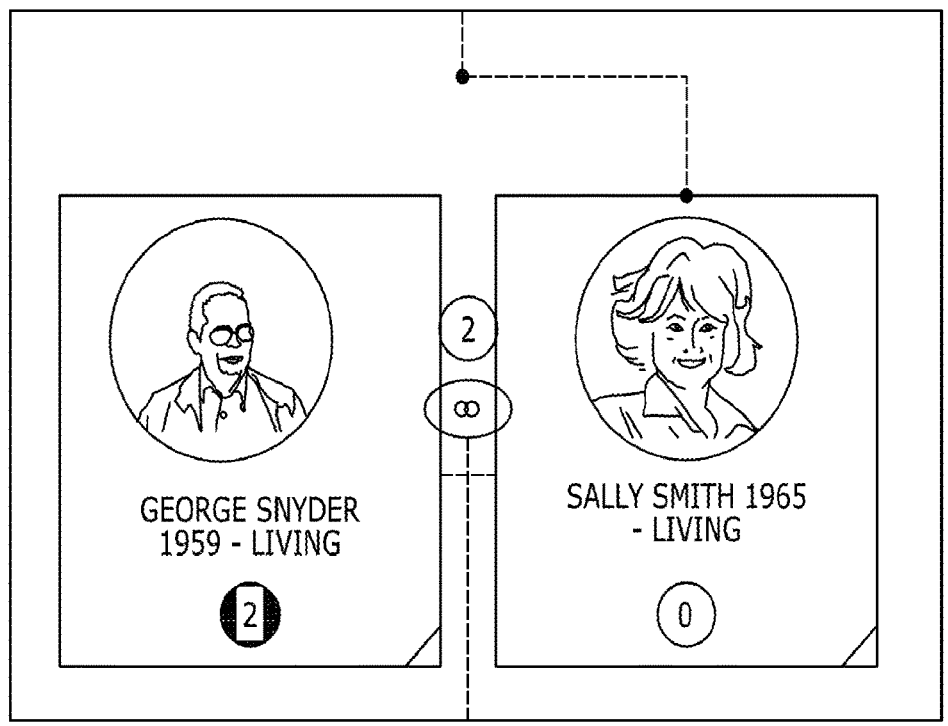
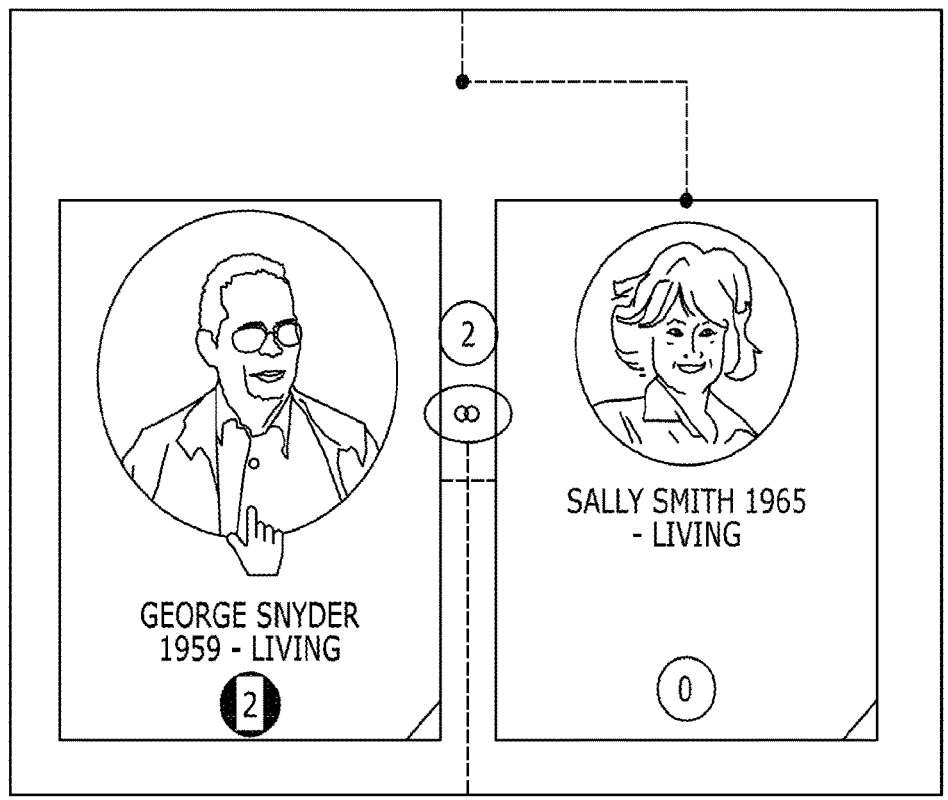
FIG. 19

FIG. 22

CLOUD-BASED INDEX AND CENTRALIZED CLOUD-BASED HUB INTERFACE FOR CLOUD-STORED MEDIA

RELATED APPLICATIONS

This application claims priority to U.S. Provisional Application No. 62/571,547, filed Oct. 12, 2017, the entire content of which is incorporated by reference herein.

FIELD

Embodiments described herein relate to creating a cloud-based index of cloud-stored files and media (referred to collectively and interchangeably herein as "media") and, in particular, creating a cloud-based index of media stored in a plurality of different cloud services. To allow access and navigation to multiple indexes, the indexes may be accessed via a cloud-based hub tree structure, such as a family tree or an organization chart, wherein selecting an organization unit, a person, or a couple directs the user to that individual person's or unit's index.

SUMMARY

Cloud storage services and cloud-based services allow users to store files, including media files, within the cloud (one or more remote servers) sometimes for file backup and sometimes for subsequent access through various devices, such as smart phones, smart wearables, tablet computers, personal computers, laptop computers, smart televisions, and the like. Many cloud storage services are designed to store differing types of media but are not necessarily designed for optimal viewing of some types of media files. Some cloud-based services specialize in storing, processing, and viewing specific types of media, like photos, videos, or combinations thereof. Still other services may specialize in allowing a user to create an online photobook or e-book that can only be viewed or played back on their cloud storage platform, thereby requiring the user to go to that service's website to view media. Similarly, another cloud -based service may specialize in allowing users to create and store blogs and other written or visual (for example, photos, images, or video) media, also sometimes requiring the user to view the media on that cloud service's website. Thus, a user may use multiple cloud storage or cloud-based services to store and access different types of media.

Accordingly, embodiments described herein allow users to organize media stored in one or a plurality of different cloud services by providing a centralized index of cloud-stored media. For example, the index may contain a table of multiple entries, each entry being associated a link or hyperlink to a file or files and media stored in a cloud-based service. The table of contents may be searchable and may provide searchable metadata on stored media, such as the type of media (photo, video, etc.), a title of the media, a description of the media, a thumbnail or preview of the media, a rating of the media, a location of the media (a website name or an icon representing the cloud service 14 where the media is stored), keywords for the media such as a person's name, a place, a location, a date or date range, and the like. Accordingly, the searchable metadata allows a user to generate or access a list of media from one or more indexes that pertain to various search terms. Also, media in one or more indexes may be searchable by automated computer visual means such as facial recognition, physical shape matching (such as an animal, landmark or building), character recognition, etc. to create a list of media pertaining to that search. The table of contents may also organize the individual media titles into chapters and super-chapters or other categories and subcategories and may allow the administrator to edit, re-sequence, and reorganize items. For example, in some embodiments, the media accessible through the index may be associated with the life or activities of an individual or events in their life, and the titles and chapters used to organize the media may represent different chapters, event types or characteristics of the individual. In other embodiments, the media accessible through the index may be associated with different aspects of an organization or collection, such as its products, its history, its awards, its media coverage, its key members, authentication documents, and the like.

An index for one individual may also be grouped with indexes for other individuals, such as family and friends, with a graphic representation of the group of indexes providing a centralized hub for accessing the individual indexes. Similarly, when an index relates to an organization, such as a division within an organization, an index for one division may be represented by a node and grouped with indexes or nodes of other divisions or parts of the organization. For example, several nodes of family members may be organized within one or more hierarchical trees, such as family trees, with each individual and family having an associated index. This centralized hub may be located on a cloud-based service allowing access from any connected device. Accordingly, the indexes for various individuals and couples may be reached through a centralized cloud-based hub or access point such as a family tree, which provides access to indexes of multiple members of that family. For example, the centralized cloud-based family tree may be used to access the indexes of multiple individuals and couples, wherein each index includes photos, home videos, mementos, documents (honors, certificates, scrapbooks, legacy journals, news clippings, and the like) and other files and media associated with family members where the linked media is stored in one or numerous different cloud-based services. Using an organizational tree or family tree interface is often a simpler, faster and more expedient interface than a linear file list of organization units, collection categories, or family members, especially if the tree extends to dozens or more units, categories or individuals. In some embodiments, the same media item may be stored just once but assigned to multiple individuals in a family tree, such as when the media relates to a couple, a family, or the like. This "shared" media may be marked or represented different from media assigned to only a single individual. Similar media organization and user interfaces can also be used within the centralized index for organizations, historical events, and the like. For example, an index for a given organization may link to product information, geographical maps, customer testimonials, photos, videos, news and magazine articles, or the like for that organization with media located in one or many cloud locations, and the same media item may be stored just once but linked to or assigned to multiple organization units or collection categories in multiple indexes.

Thus, the plethora of file and media storage and operational options available in the cloud has created a distributed environment for files and media, especially media that may be associated with an individual person, organization, or collection that may include various types of files and media. Embodiments described herein address this problem and others by providing a cloud-based index for each individual, couple, or organizational, or collection unit, and, optionally, a unique cloud-based user hub interface for organizing and accessing media stored among one or multiple different media storage options. Both the indexes and the centralized hub are hosted in a cloud environment to be accessible from multiple platforms and to provide backup security without sacrificing accessibility, which is one of the benefits of storing media in a cloud environment.

For example, one embodiment provides a system for providing cloud-based centralized hub access to media stored in a plurality of cloud services. The system includes a non-transitory, computer-readable medium storing a cloud-based hub accessible by a user via a user device over a communication network, and an electronic processor. The electronic processor is configured to execute the cloud-based hub to receive input from the user selecting an entity, access an index associated with the entity, a first entry in the index including a link to first media accessible through a first cloud service and a second entry in the index including a second link to second media accessible through a second cloud service, and, in response to selection of the first entry in the index by the user, redirect the user from the cloud-based hub to the first media accessible through the first cloud service.

Another embodiment provides a method for providing cloud-based centralized hub access to media stored in a plurality of cloud services. The method includes receiving, with an electronic processor, input from the user selecting an entity and accessing, with the electronic processor, an index associated with the entity, a first entry in the index including a link to first media accessible through a first cloud service and a second entry in the index including a second link to second media accessible through a second cloud service. The method also includes, in response to selection of the first entry in the index by the user, redirecting, with the electronic processor, the user from the cloud-based hub to the first media accessible through the first cloud service.

Yet another embodiment provides a non-transitory, computer-readable medium storing instructions that, when executed by an electronic processor, perform a set of functions. The set of functions comprising receiving input from the user selecting an entity and accessing an index associated with the entity, a first entry in the index including a link to first media accessible through a first cloud service and a second entry in the index including a second link to second media accessible through a second cloud service. The set of functions also includes, in response to selection of the first entry in the index by the user, redirecting the user from the cloud-based hub to the first media accessible through the first cloud service.

Other aspects of the invention will become apparent by consideration of the detailed description and accompanying drawings.

BRIEF DESCRIPTION OF THE DRAWINGS

FIGS. 3-22 are screenshots of indexes of cloud-stored media reached through a centralized hub interface, according to various embodiments of the invention.

DETAILED DESCRIPTION

Figure 1:
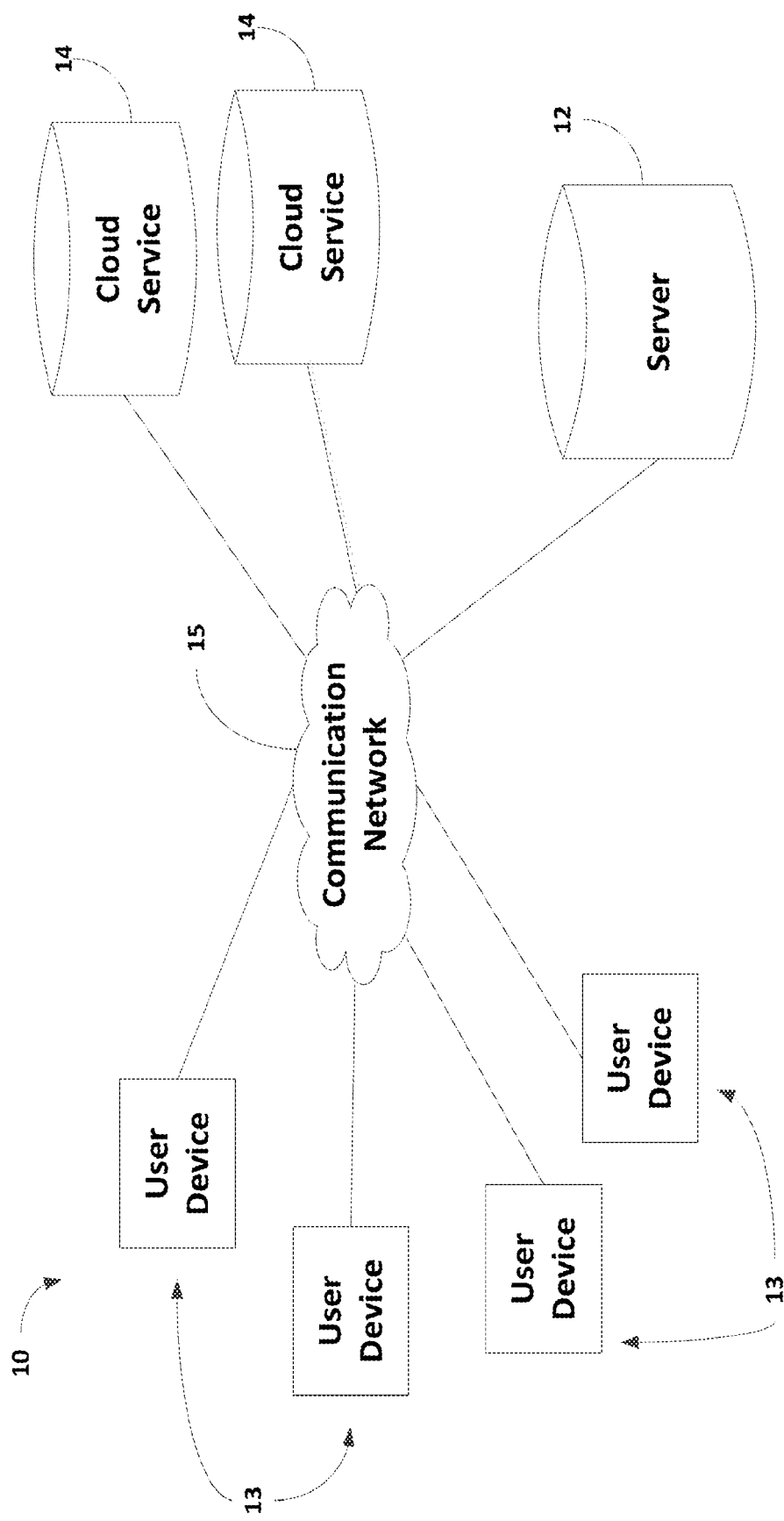
FIG. 1 schematically illustrates a system for providing a centralized index of cloud-stored media according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "predetermined" means specified prior to an event. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, embodiments described herein provide a cloud-based index for each individual or couple accessing media stored on one or a plurality of different cloud storage services, and multiple indexes reached via a singular cloud-based hub interface for quickly accessing each index. The functionality described below may be implemented through an electronic processor (a microprocessor, application-specific integrated circuit (ASIC), or another suitable electronic device) included in a server that is configured to retrieve data from non-transitory, computer-readable medium and execute, among other things, software related to the processes and methods described herein. A user may access the server and the functionality performed by the server through a user device, such as a personal computing device, such as a desktop computer, a laptop computer, a terminal, a smart television, an electronic whiteboard, a tablet computer, a smart telephone, a wearable device, or the like. An electronic processor included in the user device may access the server using a browser application or a specially-programmed application (an "app") that communicates with the server. For example, a user device may execute a browser application, such as Internet Explorer® provided by Microsoft Corporation, Chrome® provided by Google Inc., Safari® provided by Apple, Inc., or Firefox® provided by the Mozilla Foundation, to access one or more webpages provided by the server, which are displayed on a display device of the user device. The webpages may include a graphical user interface (GUI) that includes one or more selection mechanisms (input boxes, radio button, buttons, drop down menus, and the like) that a user can select using one or more input devices, such as, for example, a touchscreen, a mouse, a touchpad, a keyboard or keypad, a microphone, a camera, and the like. Input received through the GUI is provided to the server for processing. It should be understood that the functionality described herein may be performed by a single server or multiple servers (such as servers included in a cloud service or other distributed computing environment). Also, in some embodiments, functionality described herein as being performed by the server could be performed by the user device (an electronic processor included in the user device executing instructions). Furthermore, multiple user devices may access the one or more servers provided by the functionality described herein over one or more communication networks (for example, a wide area network, such as the Internet, a local area network, such as a Bluetooth™ network or Wi-Fi, or the like), over one or more dedicated (wired or wireless) connections, or a combination directly or via one or more intermediary devices. For example, the server and each user device may include a communication interface, such as wireless transceiver, that allows the computing devices to communicate over one or more communication networks.

For example, FIG. 1 schematically illustrates a system 10 for providing a centralized index of cloud-stored media according to some embodiments. As illustrated in FIG. 1, the system 10 includes a server 12, a plurality of user devices 13 (referred to herein collectively as "the plurality of user devices 13" and individually as "a user device 13"), and a plurality of cloud services 14. The server 12, the plurality of user devices 13, and the cloud services 14 communicate over one or more wired or wireless communication networks 15. Portions of the communication networks 15 may be implemented using a wide area network, such as the Internet, a local area network, such as a Bluetooth™ network or Wi-Fi, and combinations or derivatives thereof. It should be understood that the server 12 and the cloud services 14 may be configured to communicate with any number of user devices 13 and four user devices 13 are illustrated in FIG. 1 purely for illustrative purposes. Similarly, the server 12 and the user devices 13 may be configured to communicate with any number of cloud services 14 and two cloud services 14 are illustrated in FIG. 1 purely for illustrative purposes. Also, in some embodiments, the server 12 may be part of a cloud service that may include one or more servers. Furthermore, in some embodiments, the components illustrated in FIG. 1 may communicate through one or more interim devices not illustrated in FIG. 1.

Figure 2:
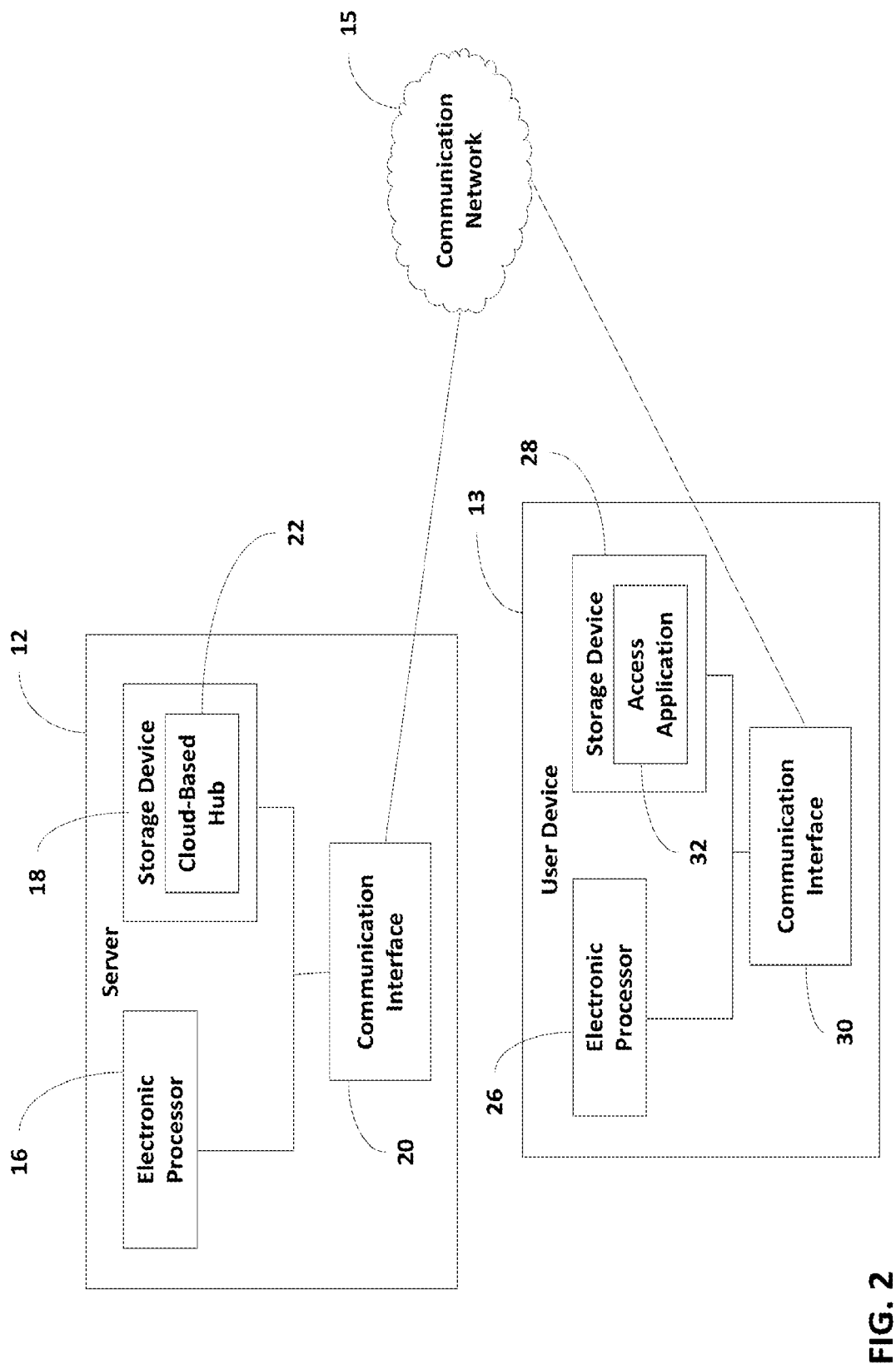
FIG. 2 schematically illustrates a server included in the system of FIG. 1 according to some embodiments.

As illustrated in FIG. 2, the server 12 includes an electronic processor 16 (for example, a microprocessor, application-specific integrated circuit (ASIC), or another suitable electronic device), a storage device 18 (for example, a non-transitory, computer-readable storage medium), and a communication interface 20, such as a transceiver, for communicating over the communication networks 15 and, optionally, one or more additional communication networks or connections. The electronic processor 16, the storage device 18, and the communication interface 20 communicate wirelessly, over one or more communication lines or buses, or a combination thereof. It should be understood that the server 12 may include additional components than those illustrated in FIG. 2 in various configurations and may perform additional functionality than the functionality described in the present application. For example, in some embodiments, the functionality described herein as being performed by the server 12 may be distributed among multiple devices, such as multiple servers operated within a cloud environment.

The electronic processor 16 executes instructions stored in the storage device 18. In particular, as illustrated in FIG. 2, the storage device 18 stores a cloud-based hub 22. The cloud-based hub 22 is a software application executable by the electronic processor 16. As described below, the cloud-based hub 22, when executed by the electronic processor 16, communicates with the plurality of user devices 13 over the communication networks 15 (through the communication interface 20) to allow a user to create or access a cloud-based index, wherein the cloud-based index includes links to media stored in one or more of the cloud services 14. It should be understood that the functionality described herein as being performed by the cloud-based hub 22 may be distributed among multiple software applications.

Each of the plurality of user devices 13 includes a desktop computer, a laptop computer, a tablet computer, a terminal, a smart telephone, a smart television, a smart wearable, other types of computing device, or a combination thereof. As illustrated in FIG. 2, similar to the server 12, each of the plurality of user devices 13 includes an electronic processor 26 (for example, a microprocessor, application-specific integrated circuit (ASIC), or another suitable electronic device), a storage device 28 (for example, a non-transitory, computer-readable storage medium), and a communication interface 30, such as a transceiver that communicates over the communication networks 15 and, optionally, one or more other communication networks or connections. One or more of the plurality of user devices 13 may include additional components than those illustrated in FIG. 2 in various configurations and may perform additional functionality than the functionality described in the present application. For example, each user device 13 include one or more input devices, output devices, or a combination thereof for interacting with a user (receiving input and providing output).

As illustrated in FIG. 2, the storage device 28 of each user device 13 stores an access application 32. The access application 32 is a software application executable by the electronic processor 26 to access the cloud-based hub 22 hosted by the server 12. In some embodiments, the access application 32 includes a browser application that allows the user device 13 to access web pages, portals, and other web services on the Internet or other forms of networks. For example, in some embodiments, the access application 32 is a browser application that a user of the user device 13 can use to access the cloud-based hub 22 as well as one or more of the cloud services 14. In other embodiments, the access application 32 is a dedicated software application executed by the user device 13 to access the cloud-based hub 22. In this situation, the user device 13 may also store a separate application (such as a browser application) for accessing one or more of the cloud services 14.

The cloud services 14 include one or more web services for storing media on a cloud, such as, for example, Facebook®, Ancestery.com®, Instagram®, Google® drive, Dropbox®, Flickr®, Yumpu®, or the like. It should be understood that the server 12 may also be considered a cloud service 14 by providing access to a cloud-based index as described below for indirectly access media in other cloud services. Also, in some embodiments, the server 12 also allows a user to store media similar to one of the cloud services 14 described above. Accordingly, the index maintained by the server 12 as described above may reference not only media stored in one or more remote cloud services 14 but also media stored on the server 12 itself (or part of a distributed or cloud based storage system associated with and accessible through the server 12).

As noted above, the cloud services 14 allow users to store media on a cloud for back-up purposes, sharing purposes, ease of access purposes, or a combination thereof. As also noted above, some cloud services 14 specialize in storing, processing, and viewing specific types of media, like photos, videos, or combinations thereof while other cloud services 14 specialize in allowing a user to create an online photobook or e-book that can only be viewed or played back on their cloud storage platform, thereby requiring the user to go to that service's website to view media. Thus, a user may use multiple cloud storage or cloud-based services to store and access different types of media, which creates inefficiencies in term of computing resources, such as bandwidth, as well as inefficiencies in terms of users being forced to manually access multiple cloud services to access their full collection of data as not all of their data can be accessed from one central location.

Accordingly, embodiments described herein (with respect to the server 12) allow users to organize media stored in one or a plurality of different cloud services 14 by providing a centralized index of cloud-stored media. The index may include a table of multiple entries, wherein each entry includes a link (for example, a hyperlink) to media stored in a cloud service 14. In some embodiments, each link is associated with a single media file or element, such as a single image, a single video file, a single document, or the like, or a collection of media, such as an album of images, an e-book, or the like. The server 12 may store the indexes in the storage device 18, on a separate storage device included in the server 12, on a remote storage device, or a combination thereof.

In some embodiments, each index is associated with a particular entity, wherein the entity may be an individual person, a group of people (for example, a couple), a department or organization unit within an organization or collection, or the like. Each entity may be associated with a master index. Each entry in the master index may include a link to media, a link to another index, or metadata regarding the entity, media, or the like. For example, the master index may act as a table of contents for the entity and may designate what media is available for the entity and how the media is organized, such as what collections (albums) of images are available for a particular entity. In some embodiments, the table of contents may be structured chronologically wherein each collection (chapters, entries, and sub-entries) represents a period of time or an event in an entity's life or other specified time period. A user (an administrator for the entity) may be allowed to modify the order or configuration of the collections, such as through drag-and-drop actions.

In some embodiments, in addition to including a link (for example, a universal resource location (URL)), an index may include metadata associated with the entity, the collection, or media associated with the link. As the index (or at least a portion thereof) may be searchable, the metadata may allow a user to (through the cloud-based hub 22) quickly and efficiently locate and access relevant media or other information. For example, in some embodiments, the index may store a preview (for example, sample or thumbnail image) of media available through a link. In particular, the cloud-based hub 22 may be configured to automatically use the link (as specified by a user when creating the index) to automatically capture a sample image or snapshot of the media associated with the link and store the snapshot with the index. Also, in some embodiments, the cloud-based hub 22 may be configured to allow viewers to comment on collections or media available through an index, rate a collection or media (using numerals, stars, or the like) to show a level of interest or importance, or perform a combination thereof. The index may also include a summary statement for an entity, an index, or an entry included in an index. The cloud-based hub 22 may be configured to receive the summary from a user as part of creating or updating an index. Alternatively or in addition, the cloud-based hub 22 may be configured to automatically generate the summary by accessing media through a link included in an index and gather or creating metadata associated with the media. For example, in some embodiments, the summary statement includes a biography of an individual or a summary of an organization unit or collection unit. In some embodiments, the index also includes a timeline or time period for an index, a collection, or particular media accessible through an index. The metadata may also include a media type (for example, image, document, album, e-book, and the like), a media title, a description of the media, a location of the media (a website name or an icon representing the cloud service 14 where the media is stored), keywords for the media, such as a person's name, a place, a location, a date or date range, and the like. Accordingly, the searchable metadata allows a user to generate or access a list of media from one or more indexes that pertain to various search terms. Also, media in one or more indexes may be searchable by automated computer visual means such as facial recognition, physical shape matching (such as an animal, landmark or building), character recognition, or the like to create a list of media pertaining to that search. The table of contents may also organize the individual media titles into chapters and super-chapters or other categories and subcategories and may allow the administrator (or those with permissions) to edit, re-sequence, and reorganize items. Editing an item may include adding or updating metadata for the item or editing the item (media) itself. For example, in some embodiments, the cloud-based hub 22 allows a user, while viewing a video in real time or by frame, to select one or more segments of a video file, which, when selected or combined with other segments, makes a new editable video copy of that selection, stores the new video copy in a cloud server, and references the new video copy in the index.

In some embodiments, the media accessible through an index maintained by the cloud-based hub 22 may be associated with the life or activities of an individual or events in their life, and the titles and chapters used to organize the media may represent different chapters, event types, or characteristics of the individual. In other embodiments, the media accessible through the index may be associated with different aspects of an organization or collection, such as its products, its history, its awards, its media coverage, its key members, authentication documents, and the like.

An index for one individual may also be grouped with indexes for other individuals, such as family and friends, with a graphic representation of the group of indexes wherein each index is represented by a type of graphic "node" and the nodes are connected into a family tree-type arrangement, with this grouping of nodes providing a centralized hub for accessing the individual indexes. Similarly, when an index relates to an organization, such as a division within an organization, an index for one division may be represented by a node and grouped with indexes or nodes of other divisions or parts of the organization in an organization tree-type structure. Similarly, when an index relates to a collection, such as a specific category of items in the collection, an index of one category of items may be represented by a node and grouped with indexes or nodes of other categories of items in a tree structure. In any implementation of this structure, "clicking on" or selecting a given node by the viewer takes the viewer to the index or collection for that node. For example, several nodes of family members may be organized within one or more hierarchical trees, such as family trees, with each individual having an associated index and also each family having an associated index. A family index may be represented by a graphic linking of family members, such as a circle intersecting both the partners of a married couple. Clicking on this link takes the viewer to that family's collection, which would be different from the individual collections. This centralized hub or tree may be located on a cloud-based service allowing access from any connected device. Additionally, numerals may be added or associated with each node that denote the number of entries (links), collections, or media associated with that node. Also, icons representing the types of media stored for each node may be represented on each node. Also, in the tree structure, a marking on a node may allow the viewer to change the view to see a different part of the tree. For example, clicking on a particular icon (for example, a triangle) in a particular area of a displayed node (for example, a corner of a node), may take the viewer to that node's family ancestry versus a spouse's family ancestry for quick navigation of the tree structure.

The cloud-based hub 22 may also provide other features. For example, in some embodiments, the cloud-based hub provides a dashboard interface that allows users to choose between seeing their own collection (linked media) or the collection (linked media) of others where they have permissions for viewing. Similarly, in some embodiments, the cloud-based hub 22 allows users to share collections with others and assign levels of privacy to each item in the collection and assign levels of permissions to each individual that is granted permission to view the collection, such that some files can be hidden from that individual's view if desired by the collection owner. In some embodiments, the cloud-based hub 22 also allows a viewer to edit a collection (depending on the viewer's permissions). The permissions set by a user (an administrator) can be changed as needed at the individual viewer level to provide further granular control over access to linked media. Also, in some embodiments, a user can use the cloud-based hub 22 to invite others to view linked media (invite others to have viewing privileges). Additionally or alternatively, the cloud-based hub 22 may allow an interested person or entity to request viewing privileges to particular linked media. Furthermore, in some embodiments, the cloud-based hub 22 provides communication functionality that allowed users to use e-mail, text, in-app, or other messaging functionality to communicate, such as to allow viewers and owner (administrators) of linked media to communicate (for example, interest, viewing status, editing requests, and the like).

For example, FIGS. 3-22 are screenshots of provided by the cloud-based hub 22 for processing access to indexes of cloud-stored media according to various embodiments of the invention. As noted above, the server 12 may be configured to generate the screenshots (by executing the cloud-based hub 22) and transmit the screenshots to a user device 13 over one or more communication networks 15. Also, in some embodiments, the server 12 may be configured to generate and transmit a portion of the data to include in a screenshot as illustrated in FIGS. 3-22 and the user device 13 may be configured to locally generate other portions or data included in the screenshots. For example, as noted above, the user device 13 may include a smart phone or a tablet that stores an access application 32, as described above, that generates the screenshots or a portion thereof and populates the screenshots with data provided by the server 12.

Figure 5:

As illustrated in FIGS. 3-5, the cloud-based index (here called a Media Collection) may be divided into a plurality of chapters or categories, and subchapters or titles, to better organize the individual file or media entries. For example, as illustrated in FIG. 3, the media is divided into a "Photos" chapter, a "Youth Passions" chapter and a "Travel" chapter. Similarly, as illustrated in FIG. 5, the media may be divided into a "Young Sheila" chapter, a "Sheila's Quilts" chapter, a "Sheila's Paintings chapter. " A user may manually specify a number of chapters included in the index and a title for each chapter. However, in some embodiments, the server 12 may be configured to automatically generate one or more chapters. For example, the server 12 may be configured to generate a default number of chapters with default names, which a user can manually adjust as needed. Alternatively, the server 12 may be configured to use metadata associated with a node, media, or a combination thereof to suggest chapters and titles of chapters (for example, based on time stamps associated with media files, titles of media files, and the like). In some embodiments, these chapters (the titles) are searchable or filterable by keyword or visual recognition to further improve efficiency and ease of use. Also, in some embodiments, a text summary of the individual or unit may be included with the index as an overview of that person or unit, as illustrated in FIG. 5 above the table of contents area.

Figure 7:
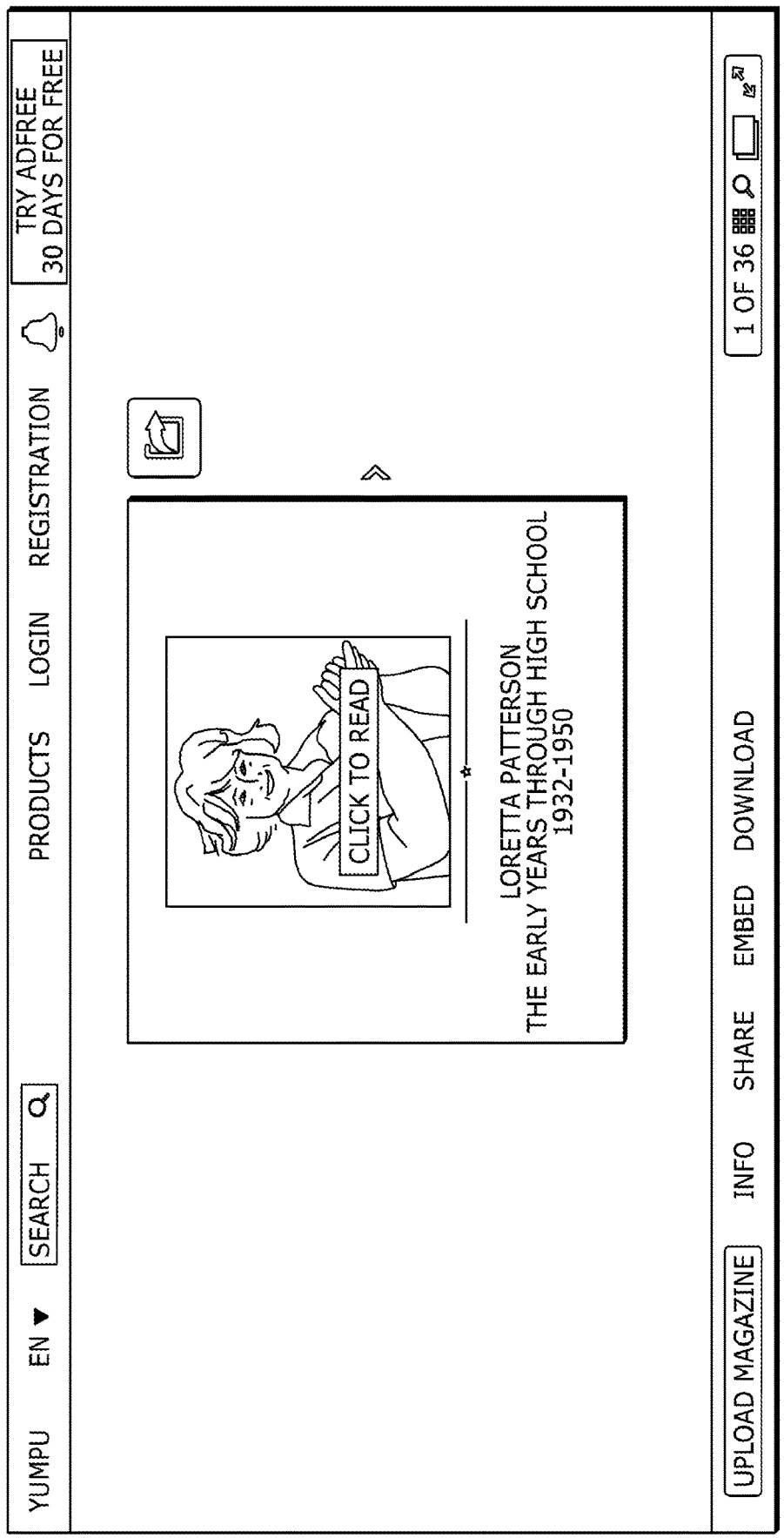
Figure 8:
Figure 9:
Figure 11C:
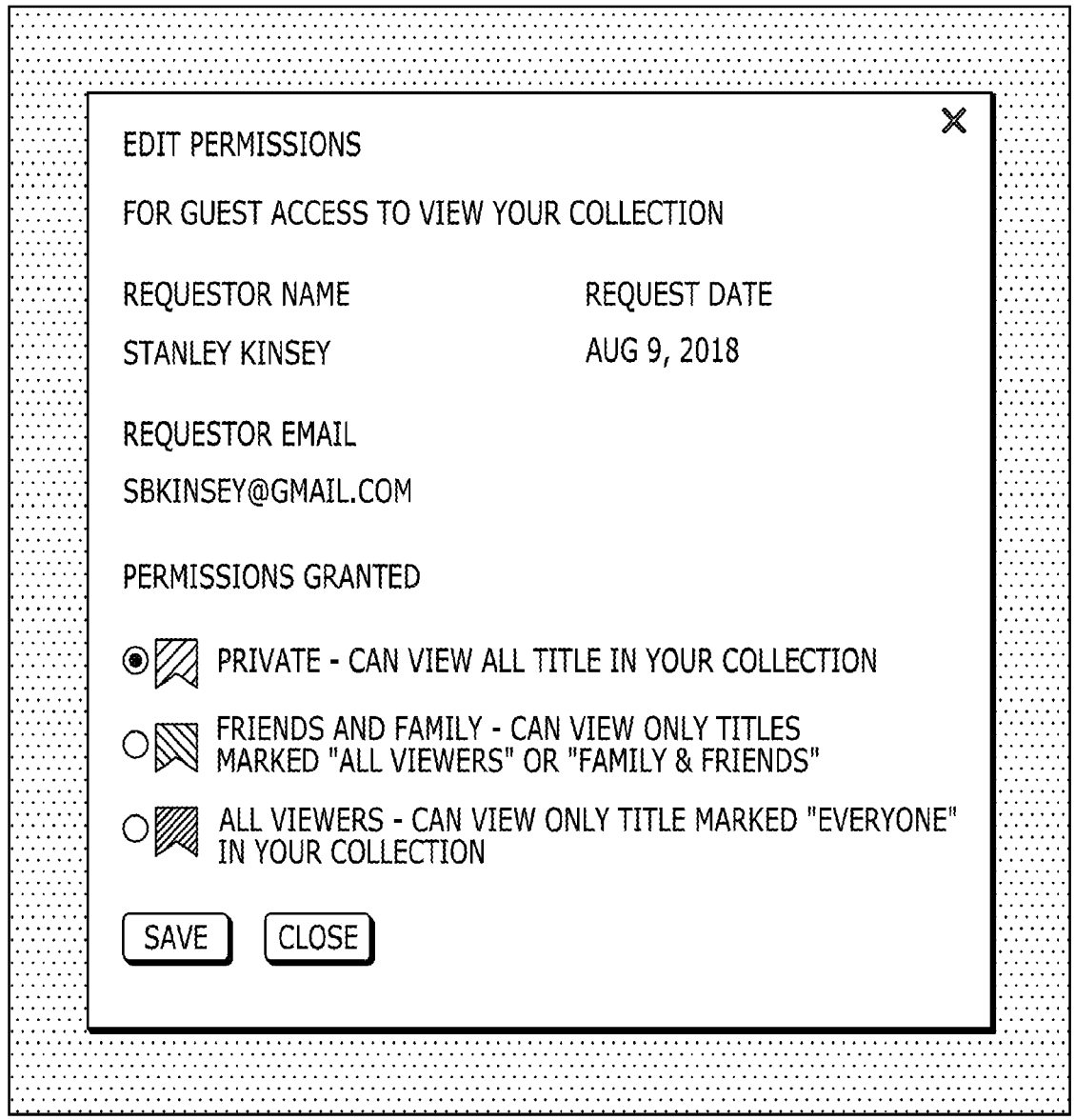
Figure 12A:
Figure 13C:
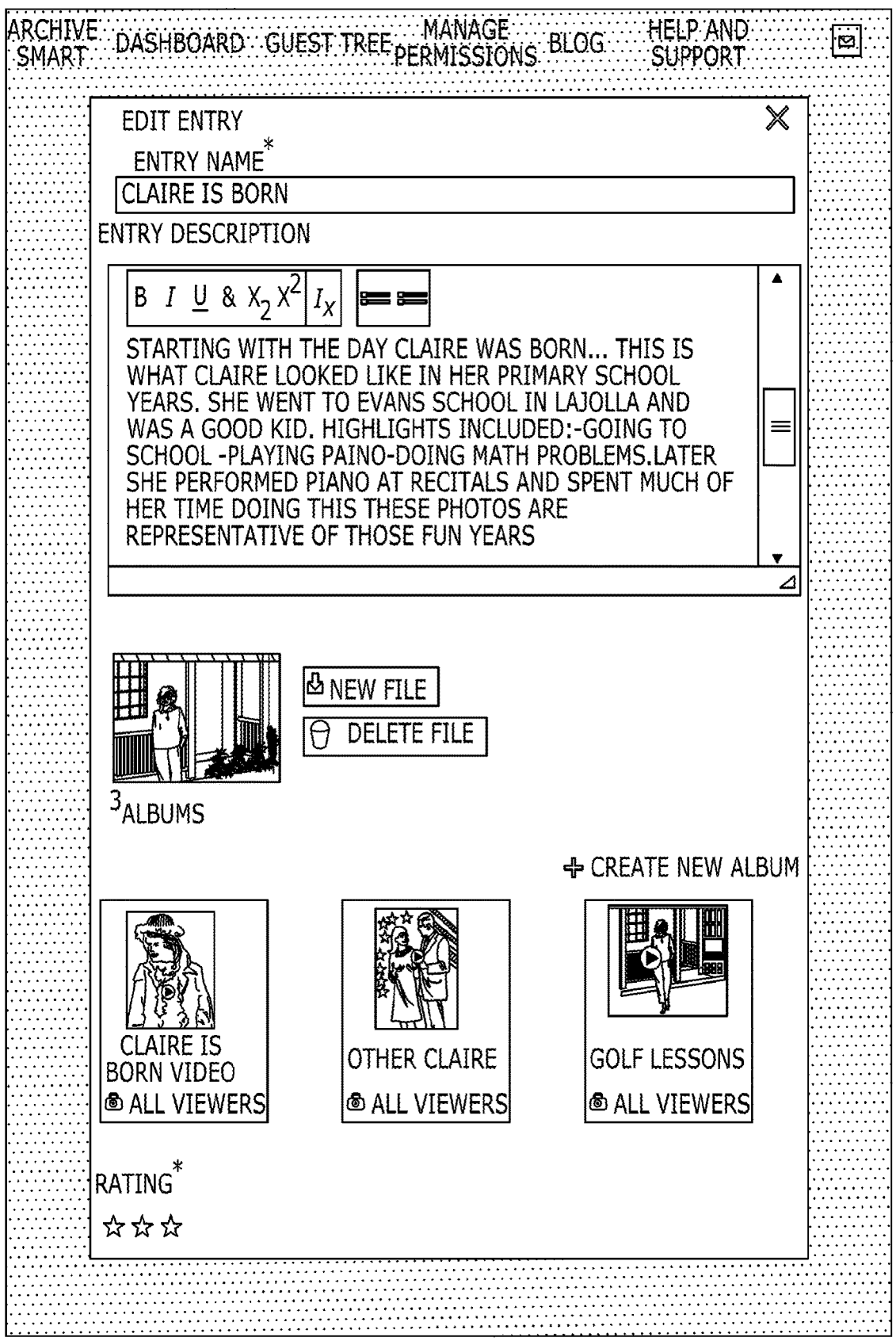
Figure 14:
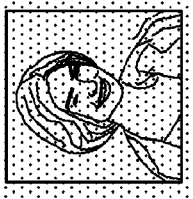

Each media file identified in an index may be associated with metadata. For example, in one embodiment, as illustrated in FIG. 6A, each listed media file may be associated with a media type icon, a title, a rating, and a cloud storage location icon or location name. As illustrated in FIGS. 6A and 8-11, hovering over the media-type icon may display both a description and a representative preview image for the media file. In another embodiment, as illustrated in FIG. 6B, the media-type icon is replaced with a preview image of the media file and a description is found under the title of the item. In the resulting index, a user can manually enter the description for a media file, which may specify the contents of the file, which individuals or items appear or are referenced in the media file, a date the media file was created, a geographic location associated with the media file (where a video was filmed), key scenes in a video, length of a video, number of photos in a collection, pages in an e-book, bookmarks within a media file, and the like. A user may also manually add the preview image, such as by generating an image of a document, capturing a still of a video, uploading a photo or the like. Alternatively or in addition, the server 12 may be configured to automatically generate a preview by automatically opening the media file and capturing data that can be used to generate a preview. In situations where the server 12 automatically generates a preview for a media file, the server 12 may continue to allow a user to modify the preview as desired. As illustrated in FIG. 11B, in the embodiment where a description of the file to be accessed is displayed in the index, the cloud-based hub 22 may allow only a few lines of the index to be viewed on the index page as a summary but may enable the viewing of the full description by allowing the viewer to click on a "READ MORE" or similar phrase or icon at the end of the displayed text. Media files linked through an index maintained by the cloud-based hub 22 may be located in one or more of the (third-party) cloud services 14, on the server 12 hosting the cloud-based hub 22, or a combination thereof. In one embodiment, to access a media file listed in the index, a user can select the media type icon or the title, which will route the user to a local cloud storage location or a third-party cloud service 14 that is storing the listed media file. For example, as illustrated by media location icons on the right in FIG. 5, an image file may be accessible through the image storage service Flickr®, an e-book through the e-magazine service Yumpu®, and a video file may be accessible through Google® drive. Accordingly, when a user selects the media type icon (clicking rather than just hovering as shown in FIG. 6), the server 12 can automatically redirect the user (in the same tab or window or in a new tab or window) to the third-party website or cloud service where the media file is available for access (viewing, playing, and the like) as illustrated in FIG. 7. For example, as illustrated in FIG. 7, when the user selected by the media (title or icon) within the cloud-based hub 22 for an e-book for Loretta Patterson, the cloud-based hub 22 redirects the user to the cloud service 14 Yumpu® to view the selected e-book. In another embodiment, the media-type icon is replaced by the preview image wherein clicking on the preview image, as shown in FIG. 6B. In some cases, as shown in FIG. 11C, the cloud-based hub 22 offers the administrator the option to control permissions as to who can view specific media when allowed access to the collection as a guest. In other cases, credentials may be required by the third party cloud service 14 to access particular media. The credentials allow the user to maintain permissions for whether media is to be seen only by certain individuals or a broader audience of guest viewers. Many third-party cloud services 14 provide a link for accessing data through their websites or services regardless of whether a user has credentials or an account with the website or services. Thus, in these situations, a user with credentials or an account with the website or services can upload or generate files through these websites and services, request a link, and provide the link to the cloud-based hub 22. The user can then apply a separate level of privacy to the indexed media that is separate from the privacy set on the third party cloud service 14 and can grant permissions to guest viewers of the cloud-based hub 22. The cloud-based hub 22 may also be configured such that media or links that are designated with a higher level of privacy than the permissions granted the viewer are not displayed within an index viewed by that viewer. Also, the cloud-based hub 22 may also allow the owner of the collection to change privacy levels for any entry or permission levels for any viewer at any time to further control access to linked media. It should be understood that the term "redirect" as used in the present application includes transferring the user to a new web page or site, displaying a pop-up or window within the cloud-based hub 22 with the requested media, displaying the requested media within a web page of the cloud-based hub 22 (by downloading a temporary version), or a combination thereof FIG. 12A illustrates an administrator's view of an Index page allowing the addition/deletion/editing of chapters and titles, the re-ordering of chapters and titles through a drag and drop method, star rating options, third-party cloud location of files, selection buttons to edit media entries, and selection buttons to copy media entries to another index. FIG. 12B shows another embodiment of an Index page that has similar functionality but also the ability for viewers to add comments to the Index Entries and Drag and Drop capability has been moved to the right side of the Index. FIG. 13A illustrates an example of a user management screen allowing the assignment or editing of a title, a description, a preview image, a media type, a media location, a rating and a hyperlink to a given media item. In another example of a user management screen, the screen has similar features but in this case the ability to enter a link (a URL) and have the preview image automatically generated for the Entry. FIG. 13C also shows an embodiment wherein more than one "Album" can be assigned to a given Index Entry, each Album having its own preview image and link. FIG. 14 illustrates an example of a user management screen allowing the copying of a media item from one index to another. FIG. 15 illustrates an example of a user management screen allowing the entering of a description of the person or unit that is the focus of the index. FIG. 16 illustrates an example of a timeline that may be created for each individual, couple or unit of organization in which key dates are shown with short descriptions in chronological order as part of the index.

Figure 17:
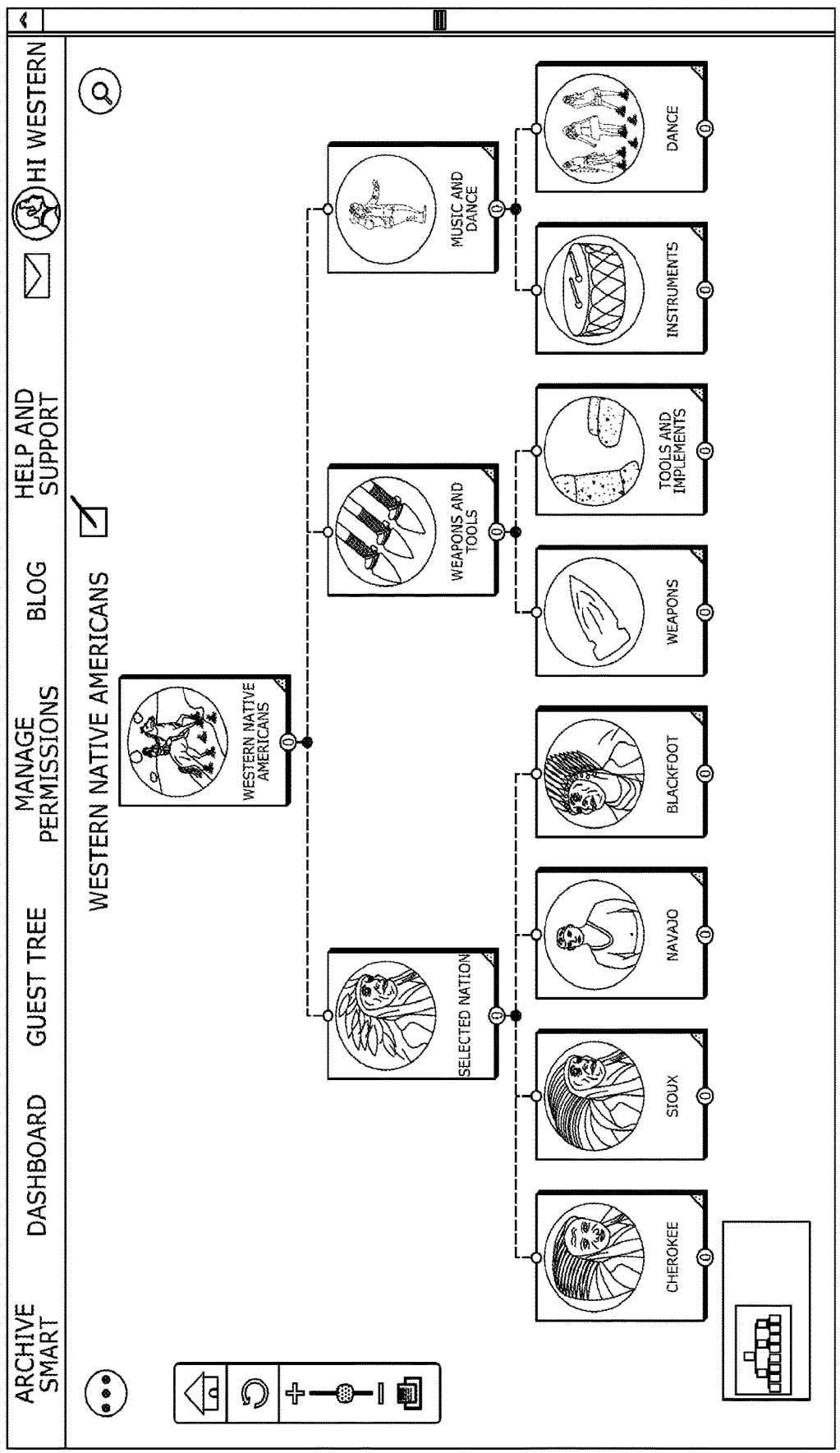
Figure 18:
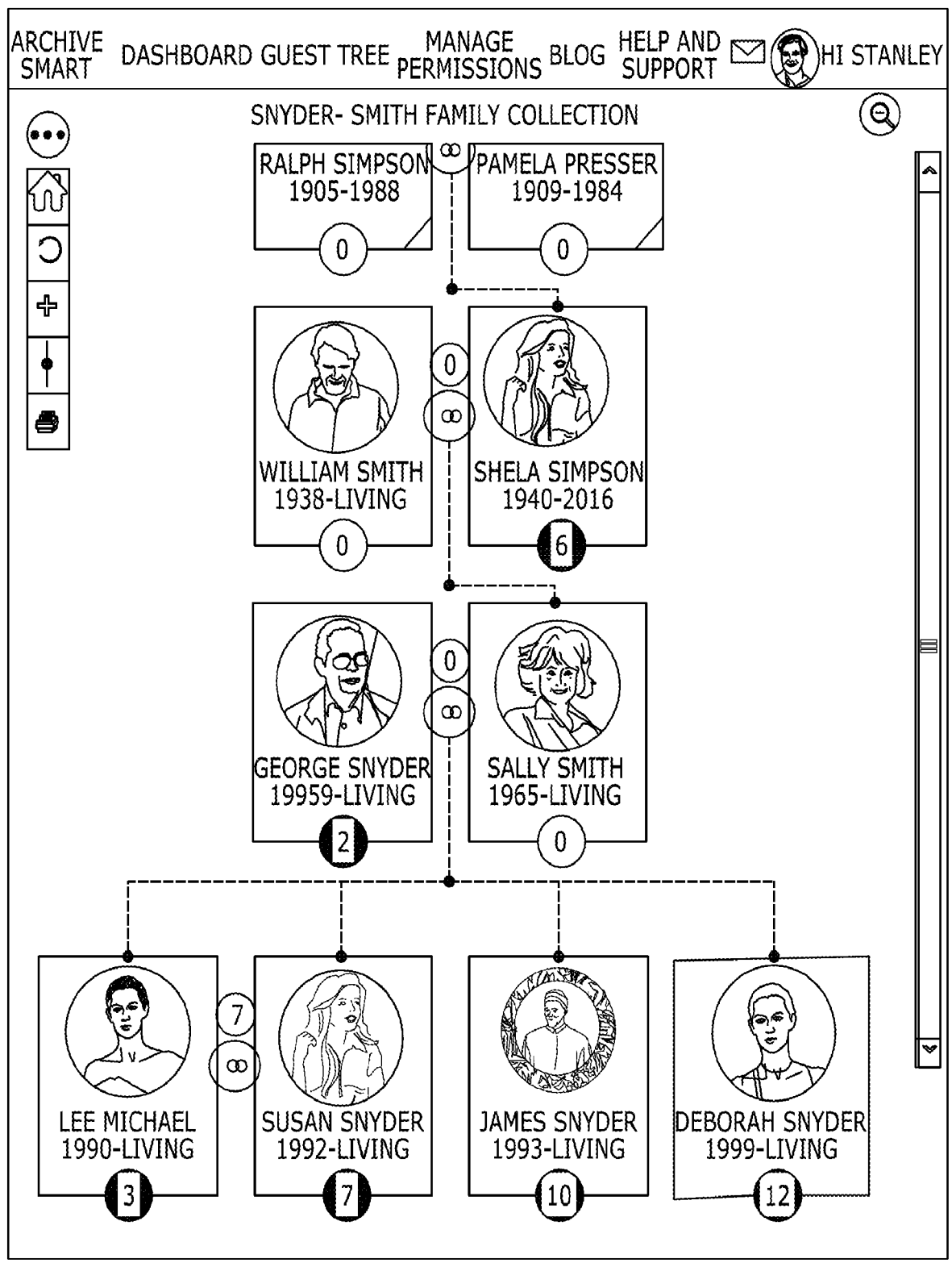
Figure 20:
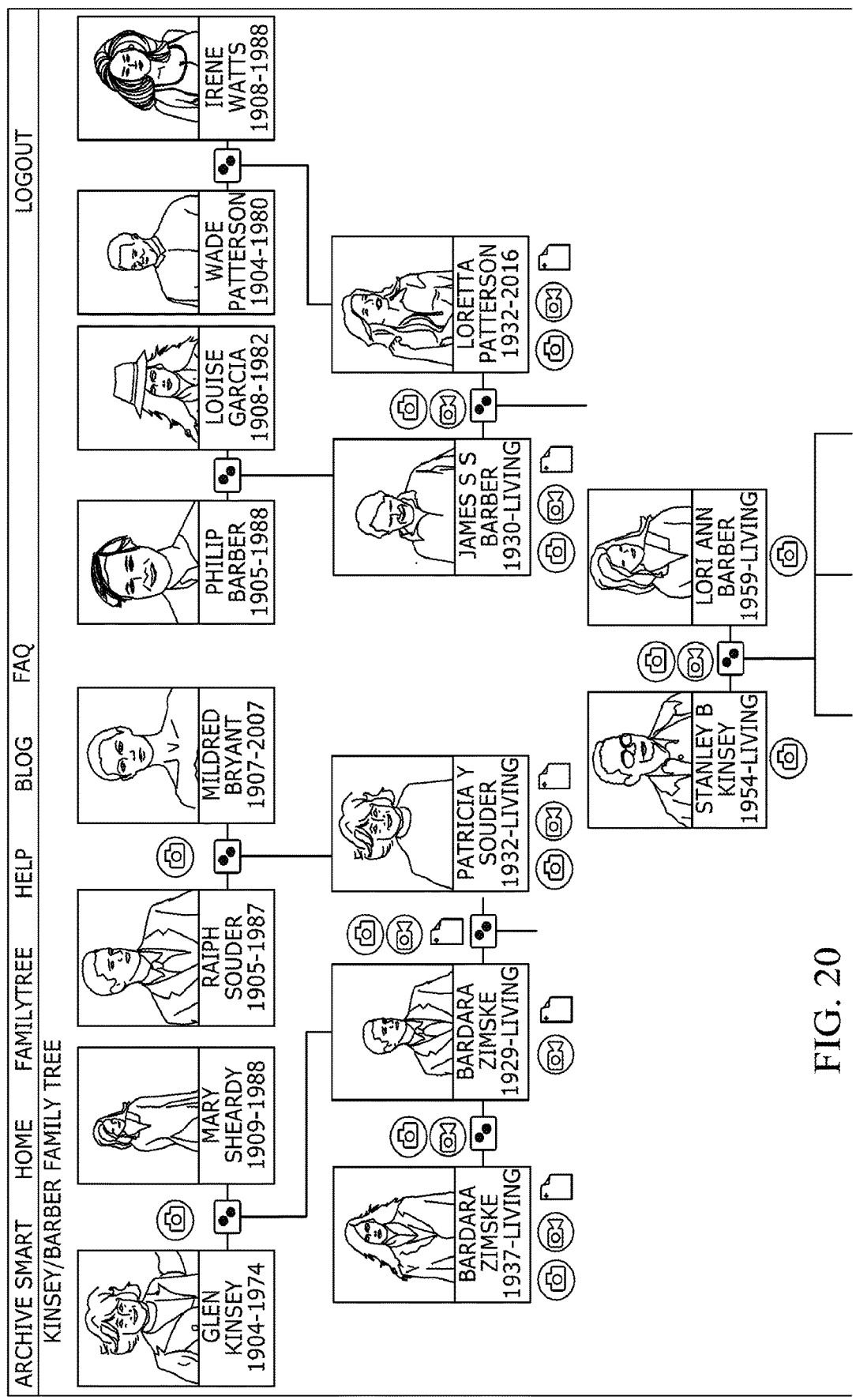

FIG. 17 illustrates an example screen shot of a cloud-based centralized hub interface generated by the server 12 as part of the index management cloud service. As illustrated in FIG. 17, a graphical hierarchy or structure may be displayed within a GUI that illustrates what indexes and types of media for those indexes are available through the centralized hub. In some embodiments, the centralized hub may be used to represent media associated with family members or members of other types of organizations, including businesses, or even of business units themselves. For example, in FIG. 17 a Collection of American Indian artifacts is graphically illustrated. As another example, as illustrated in FIG. 18, a family tree is graphically illustrated. Each node in the tree represents an individual in a family and includes a name, age information (such as a birthdate and, if applicable, a date of death), and optionally a photo. A circular "link" icon between two individuals represents a node for a couple as associated with a family. As shown in FIG. 19, when a user hovers over an individual node of the tree, the node may be highlighted or marked (such as with a border, an increase in size of image, or the like). When a user hovers over the linking circle between individuals, both individuals may be highlighted or marked (such as a border, an increase in both image sizes, or the like). Each node may also be associated with one or more icons that represent media available for the individual. For example, as illustrated in FIGS. 20, each node may be associated with a red icon with a graphic of a camera when image or photo media is available, may be associated with a green icon with a graphic of a paper when document media is available, may be associated with a blue icon with a graphic of a video camera when video media is available, and may be associated with yellow icon with a graphic of a speaker when audio media is available. As also illustrated in FIG. 20, the icons may be positioned in a first position (below a node) when the icons are associated with a specific node and may be positioned in a second position (between two nodes) when the icons are associated with more than one node, as in a couple or family. As described above, media accessible through the indexes may be assigned to a single individual or to multiple individuals, such as to a couple or family. For example, as illustrated in FIG. 19, Stanley B. Kinsey and Lori Ann Barber have a red image media icon and a blue video media icon between their images, indicating that photo and video media is available that is associated with them as a couple or family. Each node also may contain a number associated with the entire node or each individual media type noting how many media files are available for that individual node. As illustrated in FIG. 18, the icons may be positioned in a first position (below a node) when the icons are associated with a specific node and may be positioned in a second position (between two nodes) when the icons are associated with more than one node, as in a couple or family. In this embodiment, nodes that have files associated show a colored number while those with no files stored show a white circle with a "0". As described above, media accessible through the indexes may be assigned to a single individual or to multiple individuals, such as to a couple or family.

Figure 21:

To access an index of all media available for an individual or unit, a user can select the node. Clicking on one of these nodes displays a GUI that represents an index all of the files or media available for the selected node. For example, FIGS. 3 and 4 illustrate indexes of media for Susan Snyder, as an individual, and Claire and Colin, as a couple, respectively. For example, if a user clicks on the node representing Sheila Simpson in FIG. 18, the server 12 generates and provides a GUI as illustrated in FIG. 5 that lists an index of media assigned to Sheila Simpson. Similarly, to view all media assigned to more than one node (for example, media assigned to a couple), a user can click a grey outlined circle icon with a graphic of a chain positioned between the Lee Michael and Susan Snyder nodes as illustrated in FIG. 18. . In some embodiments, the icons may be also include information regarding a number of media files associated with an icon, such as how many files or media items are assigned to an individual or couple. This count information may be included in a graphic form or icon, or separately displayed for a particular node or group of nodes. FIG. 21 shows a type of Dashboard interface allowing the viewer to see their own collection of files and media and also those collections administered by others which they have permissions to view. Clicking on a collection takes the user to a tree view such as that shown in FIGS. 17 and 18.

Figure 22:
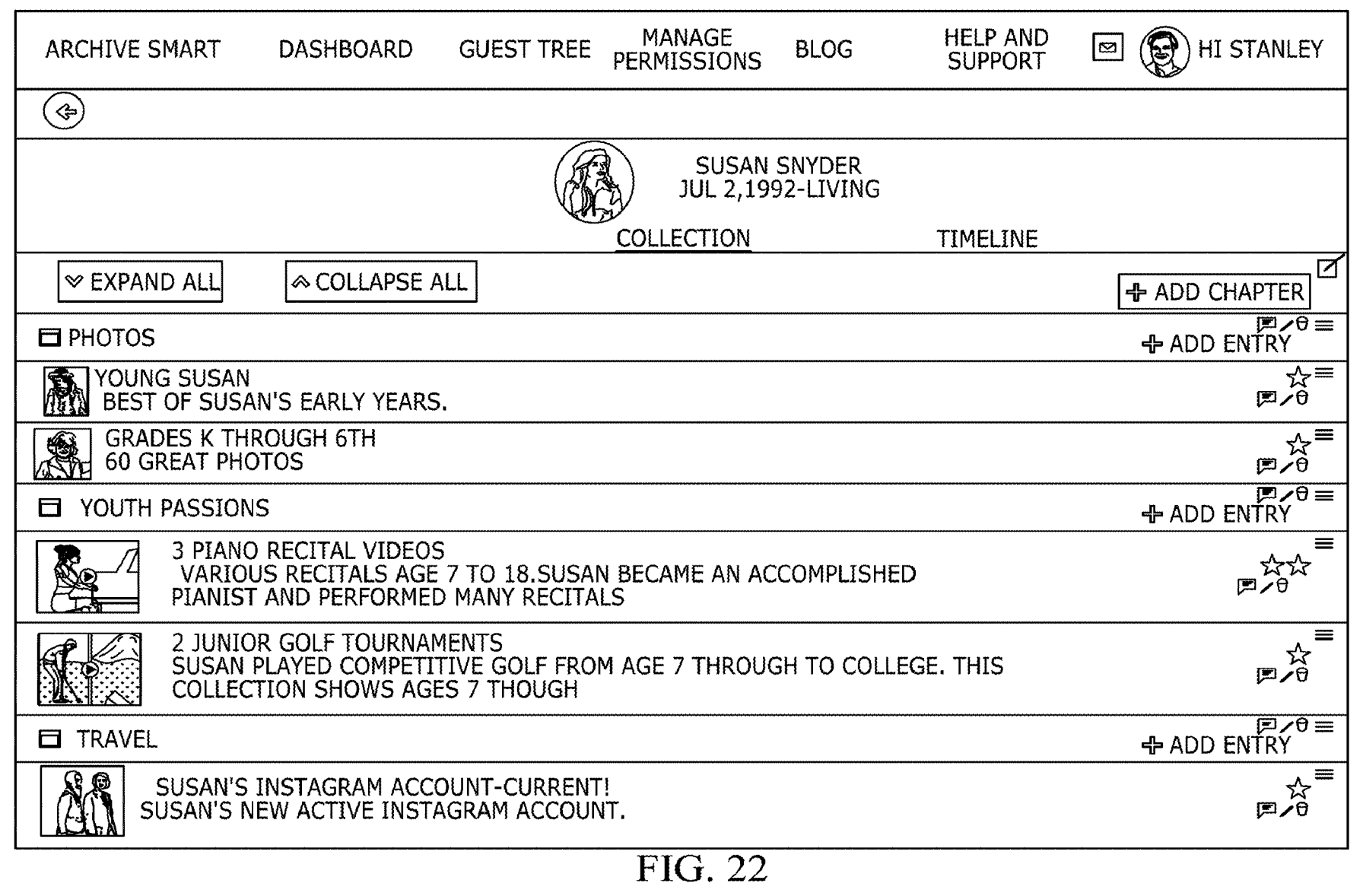

FIG. 22 shows on embodiment of using icons to allow viewers to comment or view comments, the ability for the administrator to rate an index entry with a star-level rating, and the ability to edit, delete or drag-and-drop on entry to another position in an index.

The cloud-based hub 22 may also be configured to provide additional functionality or features. For example, in some embodiments, the cloud-based hub 22 allows for multiple content editors for a particular collection (index). A user (owner) of the collection can set permissions for such editors, such as by assigning a collection an "add only" or a "full edit" privilege for non-owner editors. Also, in some embodiments, a user (owner) can set a collection to "public," such that any person accessing the cloud-based hub 22 can see the collection. Similarly, in some embodiments, the cloud-based hub 22 provides a gallery (such as on a home or entry page) that shows (or cycles through) public collections. In some embodiments, a user can also search within the cloud-based hub 22 for public collections that the user may be interested in, such as by keyword, availability date, media type, collection type, owner, or the like. In addition, in some embodiments, the cloud-based hub 22 allows a user to merge two or more collections. For example, a user can merge one or more other collections (collections they own or have edit or "merge" privileges for) into one of their own collections. Within a family or organizational tree structure as described above, these merged collections may be associated with the same or different notes. Accordingly, in some embodiments, the resulting merged collection is a combination of the individual collections and the tree to link collections may be expanded to include the nodes of the other collections.

Also, in some embodiments, the cloud-based hub 22 may be configured to allow users to record audio, video, or both (such as on a mobile device) wherein the resulting media can be added to a collection or index for a particular entity. For example, when a user clicks on an entity's node within a tree (or a particular collection associated with such a node) and starts recording, the resulting media file is stored in a cloud service and the index entry added to the node. In some embodiments, users may use this functionality to comment on media, add description or other metadata for media, or the like. In some embodiments, the ability of a non-owner user to add audio, video, or similar media to a collection or index may be controlled by the owner by setting privileges as described above.

Thus, embodiments described herein provide systems and methods for providing masses of users with the ability to create their own cloud-based centralized hub to access media stored in a plurality of cloud services. As described above, one system may include a non-transitory, computer-readable medium storing the cloud-based hub 22 accessible by a user via a user device over a communication network and an electronic processor. The electronic processor is configured to execute the cloud-based hub to receive input from the user selecting an entity and access an index associated with the entity. A first entry in the index includes a link to first media accessible through a first cloud service and a second entry in the index includes a second link to second media accessible through a second cloud service. As described above, when initially creating the index, a user may manually type in these links, copy these links, or navigate to each cloud service to receive the link or the like. For example, in some embodiments, just as a user can generate and share (via email or other electronic communication form) a link to media stored in a cloud service with others, the user may be configured to share such a link with the cloud-based hub 22, which may be configured to automatically or semi-automatically add the link included in such a communication to the appropriate user's index. Accordingly, in response to selection of the first entry in the index by the user, the cloud-based hub redirects the user from the cloud-based hub to the first media accessible through the first cloud service. As also described above and illustrated in the accompanying figures, the cloud-based hub 22 may be configured to display a tree structure including a plurality of nodes and, in response to selection of one of the plurality of nodes by the user, display the index for an entity associated with the one of the plurality of nodes. Accordingly, the indexes managed by the cloud-based hub 22 may be organized in a hierarchical structure, such as to represent a family, an organizational structure, or similar data structure or relationship. Just as entities represented within such a structure may be related, the indexes (collections) associated with related entities can similarly be related by the cloud-based hub 22, such as to allow a user to access collections associated with a group of entities, such as a couple or immediate family. Since the cloud-based hub 22 is itself a cloud service, the cloud-based hub 22 continues to allow a user to centrally organize and access media stored in a variety of cloud-services through any device (as compared to storing this media locally on a device) while eliminating the need for a user to visit each cloud service separately, which wastes computing resources and limits the user in accessing and viewing media (often of various types) within a single, unified user interface.

Various features and advantages of the invention are set forth in the following claims.

What is claimed is:

1. A system for providing a cloud-based centralized, user-managed hub to organize and retrieve media stored in a plurality of cloud services, the system comprising:
    a non-transitory, computer-readable medium storing a cloud-based hub accessible by a user via a user device over a communication network; and
    an electronic processor configured to execute the cloud-based hub to
        provide a first user interface to a user for creating and managing an index associated with an entity,
        receive, from the user via the first user interface, a first link generated via a first cloud service to first media stored in the first cloud service,
        in response to receiving the first link from the user, store the first link in the index associated with an entity;
        receive, from the user via the first user interface, a second link generated via a second cloud service to second media stored in the second cloud service, the second cloud service being different than the first cloud service, in response to receiving the second link from the user, store the second link in the index associated with the entity, receive, from the user via the first user interface, input for performing at least one of sequencing, organizing, and describing media accessible through the index;

receive input from the user selecting the entity, in response to receiving the input selecting the entity:

access the index associated with the entity, the index including a first entry including the first link to the first media stored in the first cloud service and a second entry including the second link to the second media stored in the second cloud service, and provide, based on the index associated with the entity, a second user interface for accessing and using the index, the second user interface including first data regarding the first entry and second data regarding the second entry, and in response to receiving a selection of the first data, redirect the user from the cloud-based hub to the first media stored in the first cloud service, wherein the electronic processor is further configured to execute the cloud-based hub to display a tree structure including a plurality of nodes and, in response to selection of one of the plurality of nodes by the user, display an index for an entity associated with the one of the plurality of nodes, wherein the tree structure represents a family tree and each node of the plurality of nodes represents an individual in a family and wherein the family tree includes a first icon in a first position relative to a first one of the plurality of nodes to represent media associated with a first individual represented via the first one of the plurality of nodes and includes a second icon in a second position relative to the first one of the plurality of nodes to represent media associated with the first individual represented via the first one of the plurality of nodes and a second individual represented via a second one of the plurality of nodes.

2. The system of claim 1, wherein at least two of the plurality of nodes are associated with a selection mechanism for accessing an index including media stored in one or more cloud services pertaining to a plurality of entities associated with the at least two of the plurality of nodes.

3. The system of claim 1, wherein the electronic processor is further configured to execute the cloud-based hub to display the index associated with the entity, wherein the index includes a plurality of collections and, in response to selection of one of the plurality of collections, redirects the user to media included in the one of the plurality of collections.

4. The system of claim 3, wherein the electronic processor is configured to redirect the user to the media included in the one of the plurality of collections by displaying an index of media included in the one of the plurality of collections.

5. The system of claim 3, wherein the electronic processor is configured to display the index associated with the entity by displaying each of the plurality of collections and metadata associated with at least one of the plurality of collections.

6. The system of claim 5, wherein the metadata includes at least one selected from a group consisting of a summary description of the one of the plurality of collections, a summary description of the entity, a summary description of the index, and a timeline.

7. The system of claim 1, wherein the electronic processor is further configured to execute the cloud-based hub to display a dashboard including a plurality of indexes.

8. The system of claim 1, wherein the electronic processor is further configured to execute the cloud-based hub to receive input from the user including a search query and return at least a portion of one or more indexes satisfying the search query.

9. The system of claim 8, wherein the search query includes at least one selected from a group consisting of a description of an entity, a description of a collection, a description of media, a type of media, and an identifier of a cloud service.

10. The system of claim 8, wherein the search query includes an image and wherein the electronic processor is further configured to execute the cloud-based hub to process the image included in the search query to automatically identify at least one entity included in the image and execute the search query based on the at least one entity automatically identified in the image.

11. The system of claim 1, wherein the user is an owner of the index associated with the entity.

12. The system of claim 1, wherein the user is not an owner of the index associated with the entity and has received viewing permissions from the owner of the index for accessing the index via the cloud-based hub.

13. The system of claim 1, wherein the user is not an owner of the index associated with the entity and has received viewing and editing permissions from the owner of the index for accessing the index via the cloud-based hub.

14. The system of claim 1, wherein the electronic process is further configured to execute the cloud-based hub to receive permissions from the user for the first media stored in the first cloud service, the permissions specifying the viewing and editing privileges of other users accessing the index via the cloud-based hub.

15. A method for providing a cloud-based centralized, user-managed hub to organize and retrieve media stored in a plurality of cloud services, the method comprising:

providing, with an electronic processor, a first user interface to a user for creating and managing an index associated with an entity;

receiving, with the electronic processor, from the user via a first user interface, a first link generated via a first cloud service to first media stored in the first cloud service;

in response to receiving the first link, storing, with the electronic processor, the first link in the index associated with an entity;

receiving, with the electronic processor, from the user via the first user interface, input for performing at least one of sequencing, organizing, and describing media accessible through the index;

receiving, with an electronic processor, input from the user selecting the entity;

in response to receiving the input selecting the entity:

accessing, with the electronic processor, the index associated with the entity, the index including a first entry including the first link to the first media stored in the first cloud service, and providing, with the electronic processor based on the index associated with the entity, a second user interface for accessing and using the index, the second user interface including first data regarding the first entry;

in response to receiving a selection of the first data, redirecting, with the electronic processor, the user from the cloud-based hub to the first media stored in the first cloud service, and displaying a tree structure including a plurality of nodes and, in response to selection of one of the plurality of nodes by the user, displaying an index for an entity associated with the one of the plurality of nodes, wherein the tree structure represents a family tree and each node of the plurality of nodes represents an individual in a family and wherein a first node of the plurality of nodes is associated with a first icon and a second icon, the first icon selectable by the user to access media associated with a first individual represented via the first node and the second icon selectable by the user to access media associated with the first individual represented via the first node and a second individual represented via a second node of the plurality of nodes.

16. The method of claim 15, wherein selecting the second icon displays an index including media stored in one or more cloud services pertaining to the first individual and the second individual.

17. Non-transitory, computer-readable medium storing instructions that, when executed by an electronic processor, perform a set of functions, the set of functions comprising:

receiving a link to media stored in a third-party cloud service, the link generated via the third-party cloud service;

in response to receiving the link, storing the link in an index associated with an entity, index accessible within a cloud-based hub;

receiving, from a user via a first user interface for creating and managing the index, first input for performing at least one of sequencing, organizing, and describing media accessible through the index;

receiving, within the cloud-based hub, second input from the user selecting an entity;

in response to receiving the input selecting the entity:
accessing the index associated with the entity, the index including a first entry including the first link to the first media stored in the first cloud service, and providing, based on the index associated with the entity, a second user interface for accessing and using the index, the second user interface including first data regarding the first entry;

in response to receiving a selection of the first data from the user via the second user interface, redirecting the user from the cloud-based hub to the first media stored in the first cloud service; and displaying a tree structure including a plurality of nodes, wherein the tree structure represents a family tree and each node of the plurality of nodes represents an individual in a family and wherein a first node of the plurality of nodes is associated with a first icon and a second icon, the first icon selectable by the user to access media associated with a first individual represented via the first node and the second icon selectable by the user to access media associated with the first individual represented via the first node and a second individual represented via a second node of the plurality of nodes.

18. The non-transitory, computer-readable medium of claim 17, wherein the set of functions further comprises assigning the link to one of the plurality of nodes in the tree structure, wherein each of the plurality of nodes is associated with an index, and, in response to selection of one of the plurality of nodes by the user, displaying an index for an individual associated with the one of the plurality of nodes.

* * * * *